(12) United States Patent
Yang

(10) Patent No.: US 6,225,615 B1
(45) Date of Patent: May 1, 2001

(54) MOTOR DRIVEN SURFACE TRANSLATING AMUSEMENT DEVICE INCLUDING A LIGHT SENSOR FOR MOVEMENT CONTROL

(75) Inventor: Chien-Nan Yang, Tainan (TW)

(73) Assignee: Dah Yang Toy Industries Co., Ltd., Tainan (TW)

( * ) Notice: Subject to any disclaimer, the term of this patent is extended or adjusted under 35 U.S.C. 154(b) by 0 days.

(21) Appl. No.: 09/379,114

(22) Filed: Aug. 23, 1999

(51) Int. Cl.$^7$ ........................................................ B62D 5/00
(52) U.S. Cl. ........................ 250/206; 250/231.1; 250/215; 180/205; 446/446
(58) Field of Search ..................................... 250/206, 215, 250/231.1; 180/205, 206, 209; 446/438, 465

(56) References Cited

U.S. PATENT DOCUMENTS

| | | | |
|---|---|---|---|
| 4,229,649 | * 10/1980 | Hawkins et al. | 250/215 |
| 4,345,662 | * 8/1982 | Deplante | 180/168 |
| 4,662,854 | * 5/1987 | Fang | 446/175 |
| 5,596,255 | * 1/1997 | Miyazawa | 318/568.12 |

* cited by examiner

Primary Examiner—Stephone B. Allen
(74) Attorney, Agent, or Firm—Baker Botts L.L.P.

(57) ABSTRACT

A motor driven surface translating amusement device includes a base having front and rear base parts, and a rear wheel unit having a pair of coaxial rear wheels mounted rotatably on the rear base part. A transmission mechanism is mounted on the front base part, and includes a bi-directional motor operable so as to provide forward and reverse drive power outputs, and a vertical drive shaft driven rotatably by the motor. A control unit includes a light sensor mounted on the base for detecting changes in light intensity thereat. The control unit is connected electrically to and controls the motor to provide an appropriate one of the forward and reverse drive power outputs in accordance with the light intensity detected by the light sensor. A clutch mechanism is sleeved rotatably on the drive shaft, and is in frictional engagement with the drive shaft for co-rotation therewith. A rotation restricting unit is provided on the base and the clutch mechanism for restricting angular rotation therebetween. A front wheel unit is disposed on the front base part, is mounted rotatably on the clutch mechanism, and is coupled to and driven rotatably by the drive shaft for movement of the base on a surface.

17 Claims, 9 Drawing Sheets

MOTOR DRIVEN SURFACE TRANSLATING AMUSEMENT DEVICE INCLUDING A LIGHT SENSOR FOR MOVEMENT CONTROL

BACKGROUND OF THE INVENTION

1. Field of the Invention

The invention relates to an amusement device, more particularly to a motor driven surface translating amusement device that includes a light sensor for movement control.

2. Description of the Related Art

Even though there are a wide variety of motor driven surface translating amusement devices, such as toy cars, currently available in the market, there is still a constant need to develop new amusement devices of the aforesaid type that can entice consumers to purchase the same.

SUMMARY OF THE INVENTION

The object of the present invention is to provide a motor driven surface translating amusement device that includes a light sensor for movement control.

According to the present invention, a motor driven surface translating amusement device comprises:

a base having front and rear base parts;

a rear wheel unit including a pair of coaxial rear wheels mounted rotatably on the rear base part about a horizontal axis;

a transmission mechanism mounted on the front base part, the transmission mechanism including a bi-directional motor operable so as to provide forward and reverse drive power outputs, and a vertical drive shaft driven rotatably by the motor;

a control unit including a light sensor mounted on the base for detecting changes in light intensity thereat, the control unit being connected electrically to and controlling the motor to provide an appropriate one of the forward and reverse drive power outputs in accordance with the light intensity detected by the light sensor;

a clutch mechanism sleeved rotatably on the drive shaft, the clutch mechanism being in frictional engagement with the drive shaft for co-rotation therewith;

a rotation restricting unit provided on the base and the clutch mechanism for restricting angular rotation of the clutch mechanism relative to the base; and a front wheel unit disposed on the front base part and cooperating with the rear wheel unit so as to be adapted to support the base on a surface, the front wheel unit including a front wheel axle mounted rotatably on the clutch mechanism transverse to the drive shaft, the front wheel unit being coupled to and being driven rotatably by the drive shaft for movement of the base on the surface, the front wheel unit rotating with the clutch mechanism relative to the base about the drive shaft between a first position, where the front wheel axle is generally parallel to the horizontal axis of the rear wheel unit such that the front and rear wheel units enable linear translation movement of the base on the surface, and a second position, where the front wheel axle forms an angle with the horizontal axis of the rear wheel unit such that the front and rear wheel units enable turning movement of the base on the surface.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
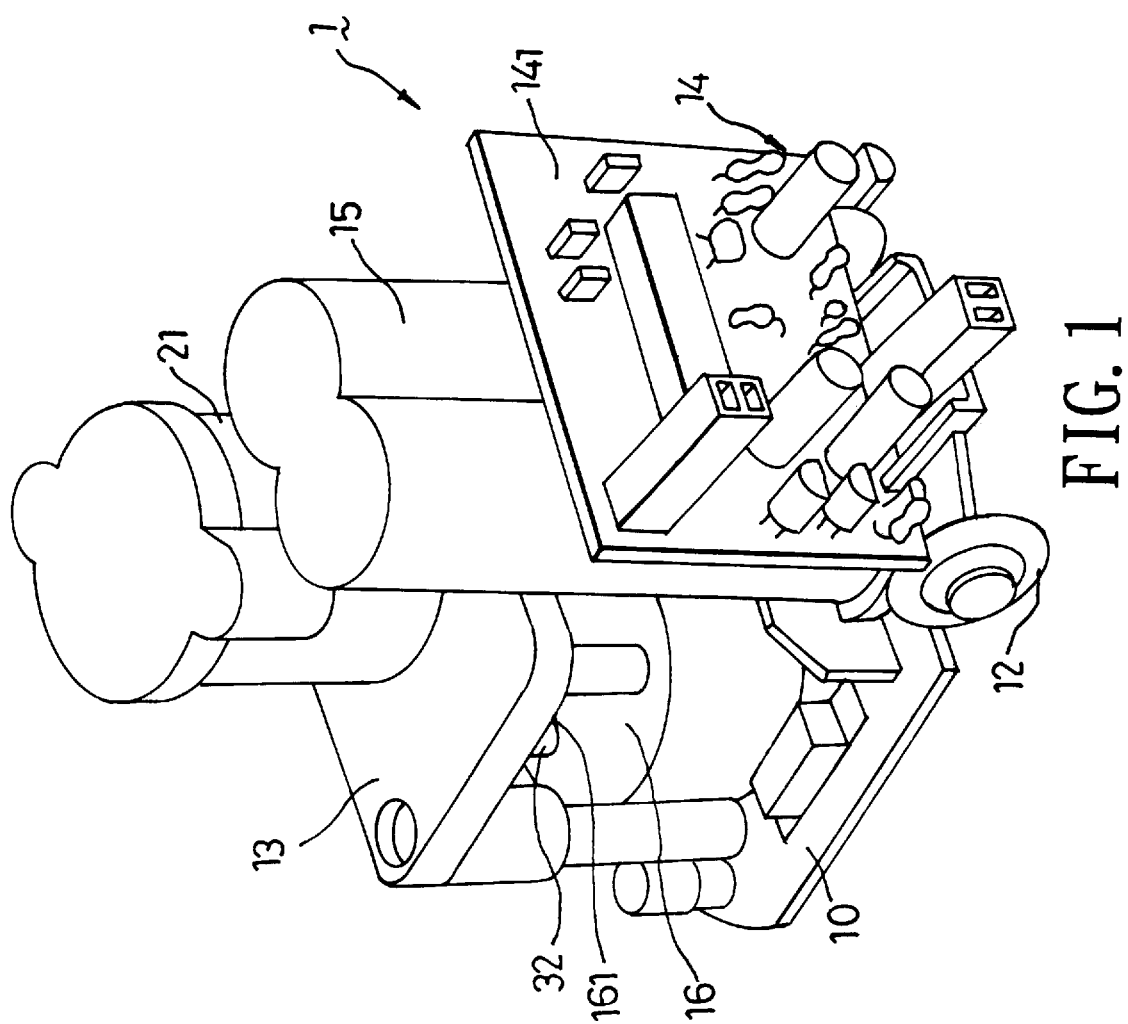
FIG. 1 is a rear perspective view of the preferred embodiment of a motor driven surface translating amusement device according to the present invention.
Figure 2:
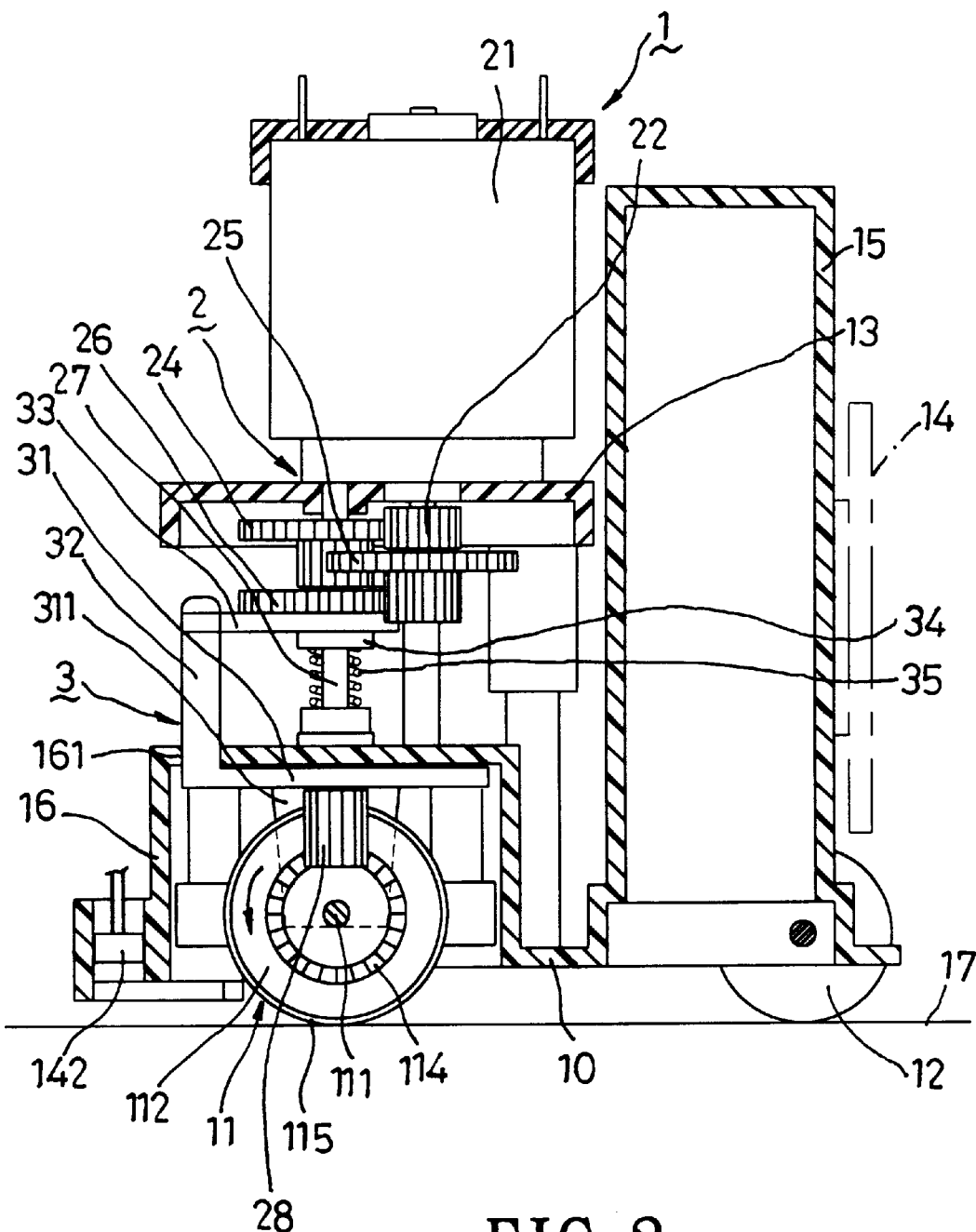
FIG. 2 is a sectional schematic side view of the preferred embodiment.
Figure 3:
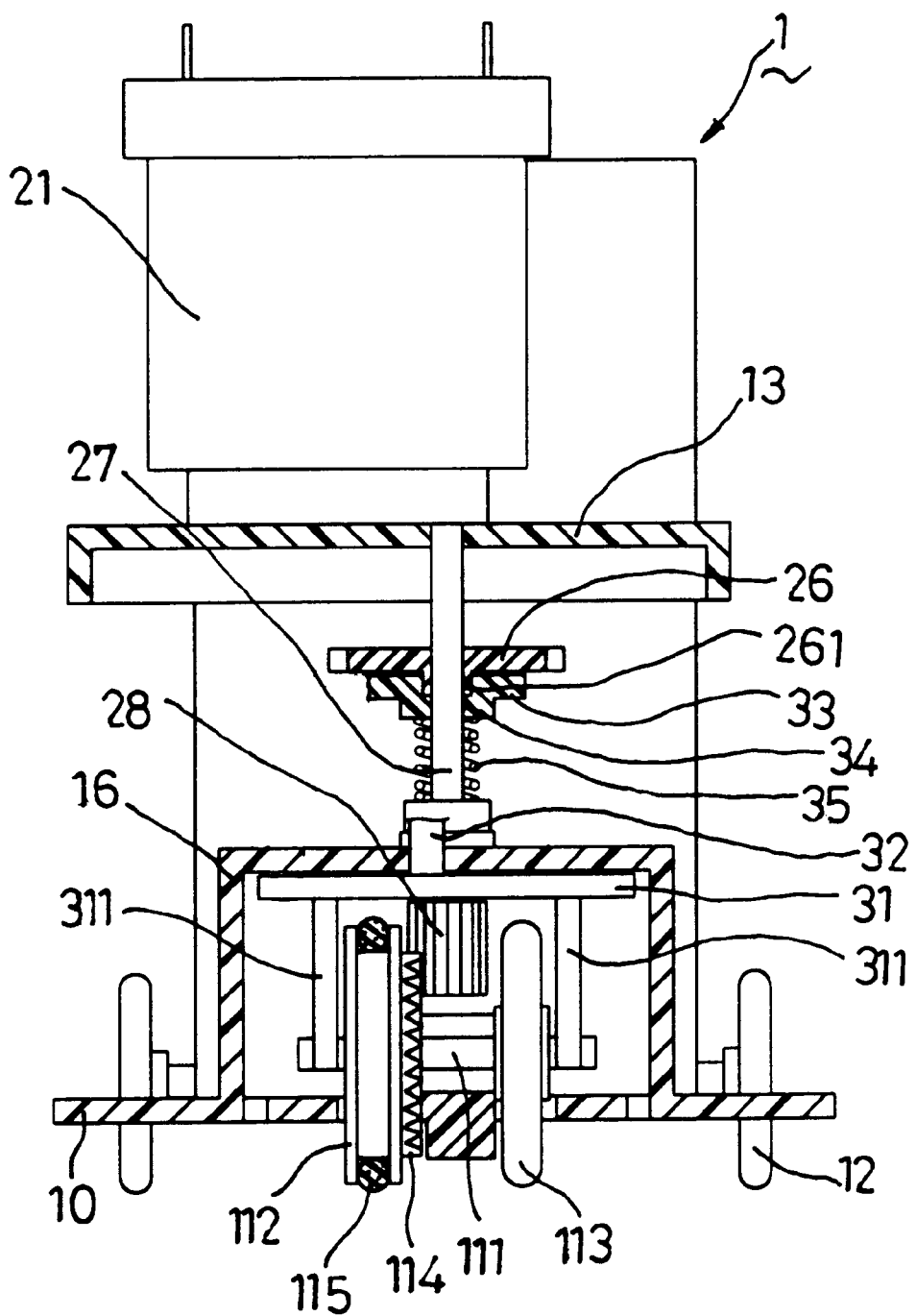
FIG. 3 is a sectional schematic front view of the preferred embodiment.

Referring to FIGS. 1, 2 and 3, the preferred embodiment of a motor driven surface translating amusement device 1 according to the present invention is shown to be adapted to be placed on a surface 17, and includes a base 10 with front and rear base parts, a front wheel unit 11 disposed on the front base part, and a rear wheel unit 12 disposed on the rear base part. The front wheel unit 11 includes a front wheel axle 111, and first and second front wheels 112, 113 mounted co-axially and spacedly on the front wheel axle 111. The rear wheel unit 12 includes a pair of coaxial rear wheels mounted rotatably on the rear base part about a horizontal axis. The front and rear wheel units 11, 12 are adapted to support the base 10 on the surface 17. Preferably, the first front wheel 112 has an annular tire rim 115 provided thereon for enhancing traction with the surface 17.

A transmission mechanism 2 includes a mounting bracket 13 on the front base part, and a bi-directional motor 21 mounted on the mounting bracket 13. The motor 21 has an output gear 22 that meshes with a large gear portion of a first speed reducing gear 24. The first speed reducing gear 24 further has a small gear portion that meshes with a large gear portion of a second speed reducing gear 25. The second speed reducing gear 25 has a small gear portion that meshes with a first drive gear 26. The first drive gear 26 is mounted securely and co-axially on an upper end of a vertical drive shaft 27. The lower end of the drive shaft 27 extends through a top wall of a hollow position limiting seat 16 that projects upwardly from the front base part, and has a second drive gear 28 mounted securely and co-axially thereon. The second drive gear 28 meshes with a ring gear 114 that is provided co-axially and securely on one side of the first front wheel 112, thereby resulting in rotation of the front wheel unit 11 upon operation of the motor 21.

Figure 4:
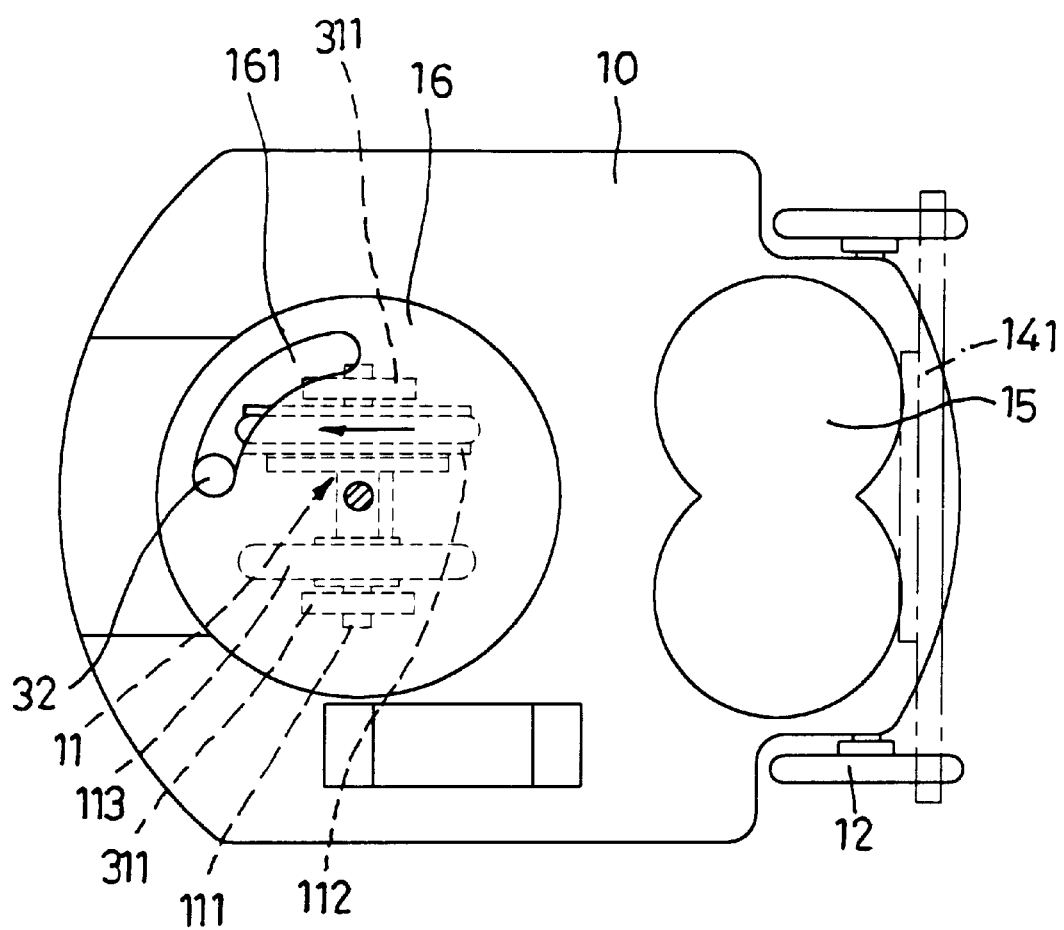
FIG. 4 is a top view of the preferred embodiment when a motor thereof provides a forward drive power output.
Figure 5:
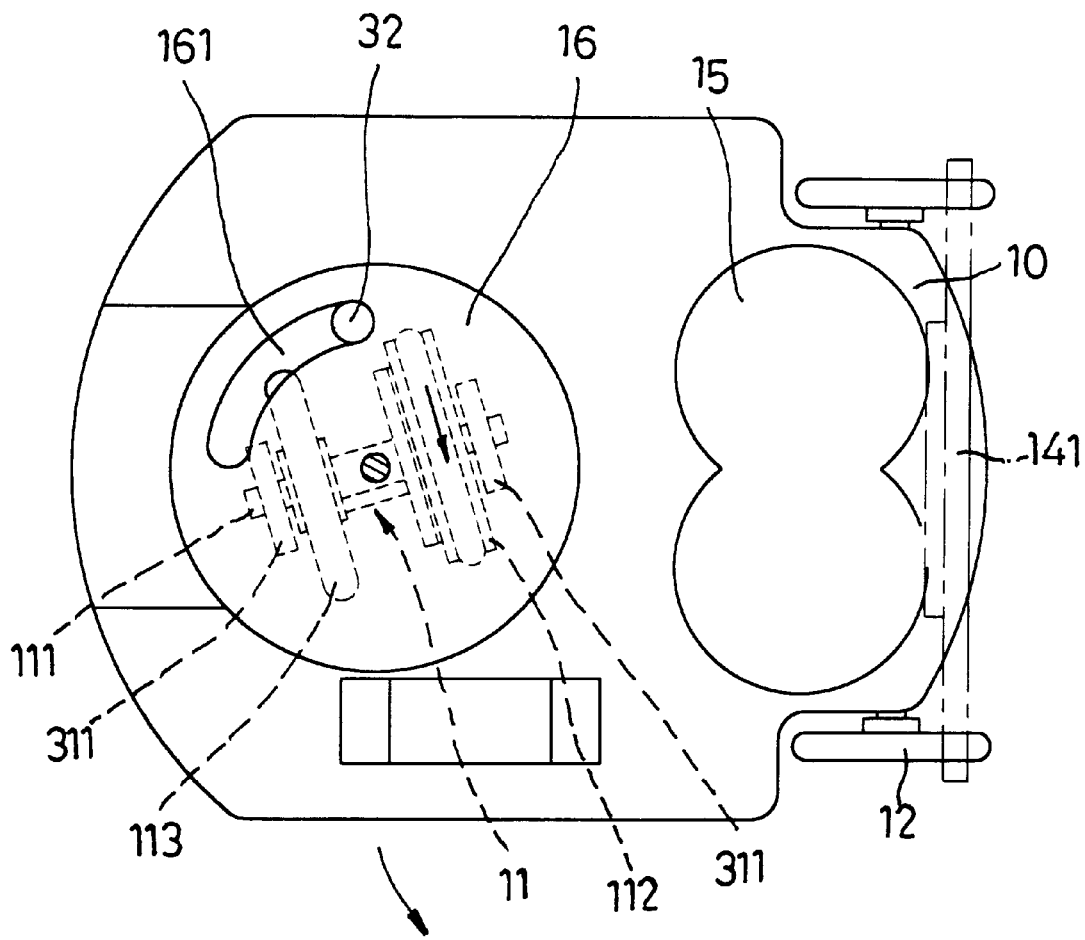
FIG. 5 is a top view of the preferred embodiment when the motor provides a reverse drive power output.

A clutch mechanism 3 includes a base plate 31 sleeved rotatably on the lower end of the drive shaft 27 and disposed in the position limiting seat 16. A pair of pivot lugs 311 extend from the bottom side of the base plate 31 and have the front wheel axle 111 of the front wheel unit 11 mounted rotatably thereon. A position limiting rod 32 projects upwardly from the base plate 31, and is offset from the drive shaft 27. The position limiting rod 32 extends through a position limiting slot 161 formed in the top wall of the position limiting seat 16. The position limiting slot 161 is curved about the drive shaft 27. The clutch mechanism 3 further includes a clutch plate 33 sleeved rotatably on the drive shaft 27 between the first drive gear 26 and the position limiting seat 16. The position limiting rod 32 is connected to a peripheral portion of the clutch plate 33. The clutch plate 33 is formed with a downwardly extending recessed portion 34 that has the drive shaft 27 extending therethrough. The first drive gear 26 has a bottom side formed with a projection 261 that abuts against the clutch plate 33 at a top side of the recessed portion 34. A spring 35, which serves as abiasing member, is sleeved on the drive shaft 27 between the clutch plate 33 and the position limiting seat 16 and biases the clutch plate 33 upwardly to result in friction contact between the clutch plate 33 and the first drive gear 26. The friction force between the first drive gear 26 and the clutch plate 33 enables the former to drive rotatably the latter. Rotation of the clutch plate 33 results in corresponding rotation of the base plate 31 and in turning movement of the front wheel unit 11 relative to the base 10. The position limiting seat 16 and the position limiting rod 32 that extends through the position limiting slot 161 cooperate to form a rotation restricting unit for restricting angular rotation of the clutch mechanism 3 relative to the base 10. As shown in FIGS. 4 and 5, the position limiting slot 161 formed in the top wall of the position limiting seat 16 has an arc length of about 90°, such that the range of angular rotation of the position limiting rod 32 and the base plate 31 and the clutch plate 33 of the clutch mechanism 3 is limited, as well as the range of turning movement of the front wheel unit 11 relative to the base 10 about the drive shaft 27.

A circuit board 141 is mounted above the rear base part, and has electrical components of a control unit 14 mounted thereon. The circuit board 141 is mounted securely on one side of a battery receiving seat 15 that extends upwardly from the base 10. The battery receiving seat 15 is adapted to receive battery cells (not shown) which supply the electrical power needed for operating the amusement device 1. The control unit 14, which is connected electrically to the motor 21, includes a light sensor 142, such as a known light sensitive resistor, mounted on a bottom side of the front base part in front of the front wheel unit 11. The light sensor 142 detects changes in the intensity of light At the bottom side of the base 10, and the control unit 14 controls the motor 21 to provide an appropriate one of forward and reverse drive power outputs in accordance with the intensity of light detected by the light sensor 142, thereby enabling forward linear translation or turning movement of the amusement device 1 on the surface 17. As to the appearance of the amusement device 1, a housing (not shown) in the form of a simulated animal or robot may be provided for enhancing consumer appeal.

Figure 6:
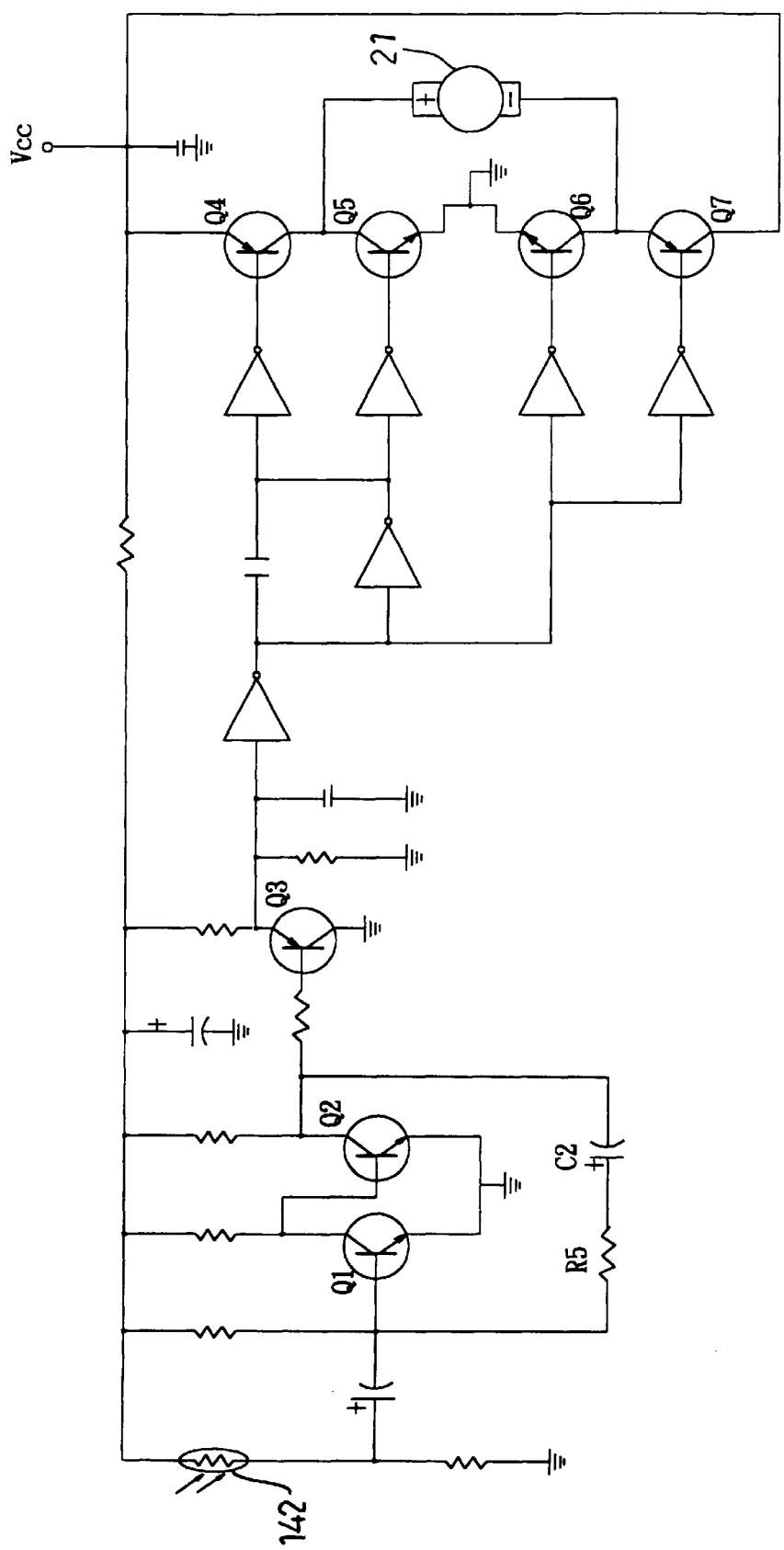
FIG. 6 is a schematic electrical circuit diagram of a control unit of the preferred embodiment.

FIG. 6 illustrates a schematic electrical circuit diagram of the control unit 14. When the intensity of light as detected by the light sensor 142 at the bottom side of the base 10 (see FIG. 2) is above a predetermined limit, the resistance of the light sensor 142 will be relatively small so as to be insufficient to cause conduction of transistors (Q1), (Q2), (Q3). Transistors (Q4), (Q6) conduct such that electrical current from the electrical power source (Vcc) will flow through the transistor (Q4), the positive and negative terminals of the motor 21, and the transistor (Q6), thereby enabling the motor 21 to provide the forward drive power output. When the intensity of light as detected by the light sensor 142 at the bottom side of the base 10 is below the predetermined limit, the resistance of the light sensor 142 will be relatively large so as to be sufficient to cause conduction of the transistors (Q1), (Q2), (Q3) within a time delay period, such as 1 second, set by resistor (R5) and capacitor (C2). Transistors (Q5), (Q7) conduct such that electrical current from the electrical power source (Vcc) will flow through the transistor (Q7), the negative and positive terminals of the motor 21, and the transistor (Q5), thereby enabling the motor 21 to provide the reverse drive power output during the time delay period. After the time delay period, the control unit 14 controls the motor 21 to once again provide the forward drive power output.

Figure 7:
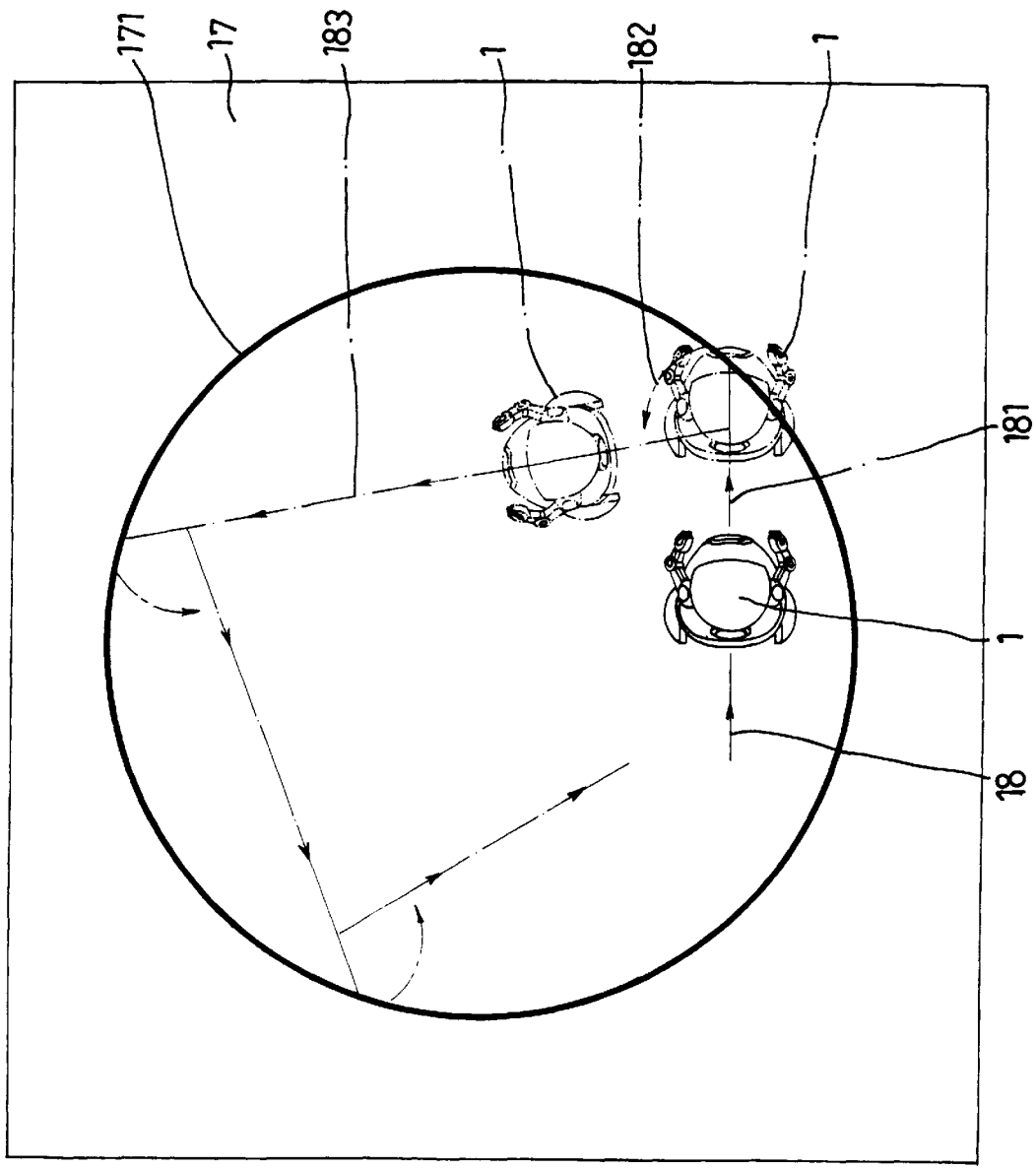
FIG. 7 is a top view illustrating an exemplary moving path of the preferred embodiment on a surface.

Referring to FIG. 7, as to how the intensity of light as detected by the light sensor 142 at the bottom side of the base 10 changes, in actual use, the surface 17 is of a light color and can be a sheet of white paper. A closed loop 171, which serves as a fence, is drawn on the surface 17 using dark-colored ink, and can be of any shape, such as a circle, an oblong, a polygon, or an irregular closed loop. The amusement device 1 is placed on the surface 17 inside the closed loop 171, and is shown to be in the form of a robot in FIG. 7. When the light sensor 142 is not directly above the closed loop 171, the intensity of light that is detected thereby will be relatively strong, and the control unit 14 enables the motor 21 to provide the forward drive power output. When the light sensor 142 is directly above the closed loop 171, the intensity of light that is detected thereby will be relatively weak due to the light absorbing characteristics of the dark-colored closed loop 171, and the control unit 14 enables the motor 21 to provide the reverse drive power output within the preset time delay period.

Figure 8:
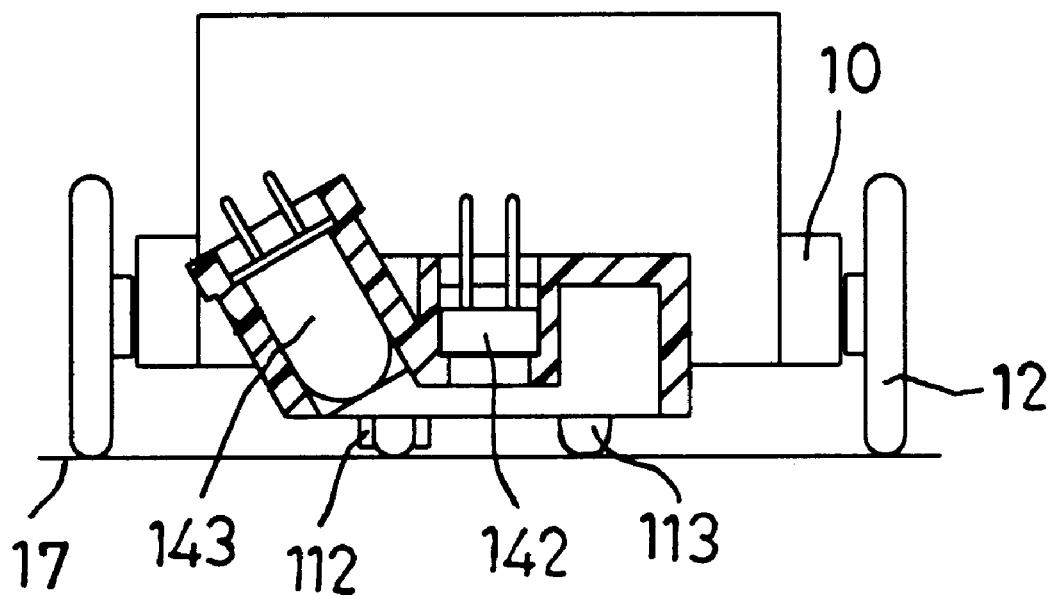
FIG. 8 is another sectional schematic front view of the preferred embodiment to illustrate a light source and a light sensor thereof.

Preferably, as shown in FIG. 8, in order to enhance brightness at the bottom side of the base 10, a light source 143, such as a light emitting diode, is mounted on the bottom side of the front base part adjacent to the light sensor 142. The light source 143 is preferably mounted in an inclined position so that a portion of the light emitted thereby can be reflected by the surface 17 to the light sensor 142.

The operation of the preferred embodiment will now be described in greater detail in the succeeding paragraphs to provide a clearer understanding of how the front wheel unit 11 is driven by the transmission mechanism 2 and the clutch mechanism 3 to move the amusement device 1 along a path 18 on the surface 17 inside the closed loop 171 of FIG. 7.

The state of the front wheel unit 11 as shown in FIGS. 2, 3, and 4 is one for enabling forward linear translation of the amusement device 1 on the surface 17. Initially, when the light sensor 142 has yet to reach a position directly above the closed loop 171, the intensity of light that is detected thereby will be relatively strong, and the control unit 14 enables the motor 21 of the transmission mechanism 2 to provide the forward drive power output for rotating the first drive gear 26 in a first direction. The friction force between the first drive gear 26 and the clutch plate 33 enables the former to drive rotatably the latter in a counterclockwise direction until the position limiting rod 32 abuts against a first end of the position limiting slot 161 (see FIG. 4), during which time slipping between the first drive gear 26 and the clutch plate 33 occurs. At this time, the front wheel axle 111 of the front wheel unit 11 is generally parallel to the horizontal axis of the rear wheel unit 12 to enable the amusement device 1 to translate along a straight line on the surface 17. Because the second drive gear 28, which rotates simultaneously with the first drive gear 26 due to the drive shaft 27, meshes with the ring gear 114 on the first front wheel 112, the front wheel unit 11 will be driven to result in forward translation of the amusement device 1 on the surface 17 along the first linear section 181 of the path 18 shown in FIG. 7.

When the amusement device 1 translates on the surface 17, it will eventually reach a position where the light sensor 142 is directly above the closed loop 171. At this time, the intensity of light that is detected by the light sensor 142 will be relatively weak, and the control unit 14 enables the motor 21 of the transmission mechanism 2 to provide the reverse drive power output for rotating the first drive gear 26 in a second direction opposite to the first direction within the time delay period. The friction force between the first drive gear 26 and the clutch plate 33 enables the former to drive rotatably the latter in a clockclockwise direction until the position limiting rod 32 abuts against a second end of the position limiting slot 161 (see FIG. 5), during which time slipping between the first drive gear 26 and the clutch plate 33 occurs. At this time, the front wheel axle 111 of the front wheel unit 11 forms an angle with the horizontal axis of the rear wheel unit 12 to enable the amusement device 1 to turn on the surface 17. Because the second drive gear 28 drives the front wheel unit 11 to rotate in an opposite direction, leftward turning movement of the amusement device 1 on the surface 17 along a first turning section 182 of the path 18 will occur, as shown in FIG. 7.

At the end of the time delay period, because turning of the amusement device 1 has moved the light sensor 142 away from the closed loop 171 such that the intensity of light that is detected thereby will once again be relatively strong, the control unit 14 will once more enable the motor 21 of the transmission mechanism 2 to provide the forward drive power output for rotating the first drive gear 26 in the first direction. The friction force between the first drive gear 26 and the clutch plate 33 enables the former to drive rotatably the latter in the counterclockwise direction until the position limiting rod 32 abuts against the first end of the position limiting slot 161 (see FIG. 4), and the front wheel axle 111 of the front wheel unit 11 is once again generally parallel to the horizontal axis of the rear wheel unit 12 to enable the amusement device 1 to translate along a straight line on the surface 17. The second drive gear 28 drives the front wheel unit 11 to result in forward translation of the amusement device 1 on the surface 17 along the second linear section 183 of the path 18 shown in FIG. 7. Forward translation of the amusement device 1 proceeds along the second linear section 183 until the light sensor 142 is once again directly above the closed loop 171, during which time the amusement device 1 turns before continuing to translate forwardly and linearly.

It has thus been shown that the amusement device 1 of this invention cycles between forward linear translation and turning movements on the surface 17 inside the closed loop 171. By changing the shape of the closed loop 171, the path translated by the amusement device 1 can change accordingly.

Figure 9:
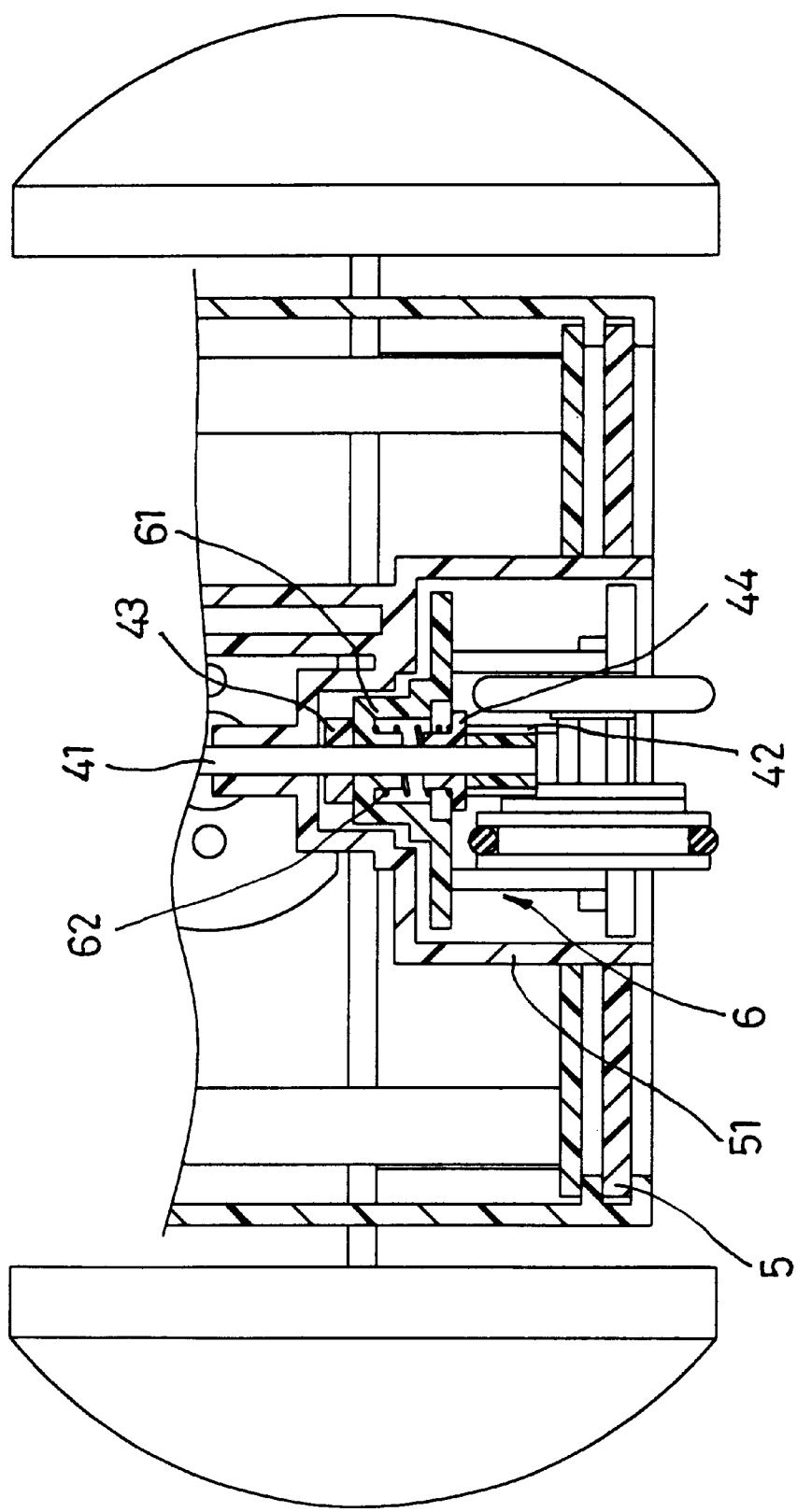
FIG. 9 is a fragmentary sectional schematic front view illustrating a modified preferred embodiment of a motor driven surface translating amusement device according to the present invention.

Referring to FIG. 9, in a modified preferred embodiment of this invention, the lower end of a drive shaft 41 of a transmission mechanism similarly extends through a top wall of a hollow position limiting seat 51 that projects upwardly from a base 5, and has a drive gear 42 mounted co-axially and securely thereon for driving rotatably a front wheel unit. Between the drive gear 42 and the top wall of the position limiting seat 51, the drive shaft 41 has upper and lower axle sleeves 43, 44 mounted fixedly thereon. A base plate 61 of a clutch mechanism 6 is sleeved rotatably on the drive shaft 41 between the upper and lower axle sleeves 43, 44. The front wheel unit is mounted rotatably on the base plate 61. A spring 62, which serves as a biasing member, is sleeved on the drive shaft 41 between the base plate 61 and the lower axle sleeve 44, and biases the base plate 61 upwardly to result in friction contact between the base plate 61 and the upper axle sleeve 43. The friction force between the upper axle sleeve 43 and the base plate 61 enables the former to drive rotatably the latter. A rotation restricting unit (not visible), similar to the position limiting rod 32 and the position limiting slot 161 in the position limiting seat 16 of the previous embodiment, is also employed in the embodiment of FIG. 9.

Since the operation and structure of the remaining components of the embodiment of FIG. 9 are generally similar to those described beforehand, a description of the same is omitted herein for the sake of brevity.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A motor driven surface translating amusement device, comprising:

a base having front and rear base parts;

a rear wheel unit including a pair of coaxial rear wheels mounted rotatably on said rear base part about a horizontal axis;

a transmission mechanism mounted on said front base part, said transmission mechanism including a bi-directional motor operable so as to provide forward and reverse drive power outputs, and a vertical drive shaft driven rotatably by said motor;

a control unit including a light sensor mounted on said base for detecting changes in light intensity thereat, said control unit being connected electrically to and controlling said motor to provide an appropriate one of the forward and reverse drive power outputs in accordance with the light intensity detected by said light sensor;

a clutch mechanism sleeved rotatably on said drive shaft, said clutch mechanism being in frictional engagement with said drive shaft for co-rotation therewith;

a rotation restricting unit provided on said base and said clutch mechanism for restricting angular rotation of said clutch mechanism relative to said base; and a front wheel unit disposed on said front base part and cooperating with said rear wheel unit so as to be adapted to support said base on a surface, said front wheel unit including a front wheel axle mounted rotatably on said clutch mechanism transverse to said drive shaft, said front wheel unit being coupled to and being driven rotatably by said drive shaft for movement of said base on the surface, said front wheel unit rotating with said clutch mechanism relative to said base about said drive shaft between a first position, where said front wheel axle is generally parallel to the horizontal axis of said rear wheel unit such that said front and rear wheel units enable linear translation movement of said base on the surface, and a second position, where said front wheel axle forms an angle with the horizontal axis of said rear wheel unit such that said front and rear wheel units enable turning movement of said base on the surface.

2. The motor driven surface translating amusement device as claimed in claim 1, wherein said drive shaft has upper and lower ends with first and second drive gears mounted respectively and securely thereon, said first drive gear being coupled to said motor, said second drive gear being coupled to said front wheel unit.

3. The motor driven surface translating amusement device as claimed in claim 2, wherein said front wheel unit further includes a first front wheel mounted co-axially on said front wheel axle, said first front wheel having one side provided with a ring gear that meshes with said second drive gear.

4. The motor driven surface translating amusement device as claimed in claim 3, wherein said first front wheel further has an annular tire rim provided thereon for enhancing traction with the surface.

5. The motor driven surface translating amusement device as claimed in claim 3, wherein said front wheel unit further includes a second front wheel mounted co-axially on said front wheel axle and spaced apart from said first front wheel.

6. The motor driven surface translating amusement device as claimed in claim 2, wherein said rotation restricting unit includes:

a hollow position limiting seat projecting upwardly from said front base part, said position limiting seat having said lower end of said drive shaft extending thereinto and being formed with a position limiting slot that is curved about said drive shaft; and a position limiting rod provided on said clutch mechanism and extending into said position limiting slot so as to restrict further angular rotation of said clutch mechanism with said drive shaft relative to said base in a first direction when disposed in one end of said position limiting slot for retaining said front wheel unit in the first position, and in a second direction when disposed in the other end of said position limiting slot for retaining said front wheel unit in the second position.

7. The motor driven surface translating amusement device as claimed in claim 6, wherein said position limiting slot has an arc length of about 90°.

8. The motor driven surface translating amusement device as claimed in claim 6, wherein said clutch mechanism includes a base plate disposed in said position limiting seat and sleeved rotatably on said drive shaft, said base plate being connected to said position limiting rod and having a pair of pivot lugs for mounting rotatably said front wheel axle thereon.

9. The motor driven surface translating amusement device as claimed in claim 8, wherein said drive shaft further has upper and lower axle sleeves mounted thereon between said position limiting seat and said second drive gear, said base plate being sleeved rotatably on said drive shaft between said upper and lower axle sleeves, said clutch mechanism further including a biasing member disposed between said base plate and said lower axle sleeve for biasing said base plate toward said upper axle sleeve in order to result in friction contact between said base plate and said upper axle sleeve.

10. The motor driven surface translating amusement device as claimed in claim 4, wherein said clutch mechanism further includes:

a clutch plate sleeved rotatably on said drive shaft between said first drive gear and said position limiting seat and connected to said position limiting rod; and a biasing member disposed between said clutch plate and said position limiting seat for biasing said clutch plate toward said first drive gear in order to result in friction contact between said clutch plate and said first drive gear.

11. The motor driven surface translating amusement device as claimed in claim 10, wherein said clutch plate is formed with a downwardly extending recessed portion, and said first drive gear has a bottom side formed with a projection that abuts against said clutch plate at a top side of said recessed portion.

12. The motor driven surface translating amusement device as claimed in claim 1, wherein said control unit controls said motor to provide the forward drive power output for enabling linear translation movement of said base on the surface, and to provide the reverse drive power output for enabling turning movement of said base on the surface.

13. The motor driven surface translating amusement device as claimed in claim 12, wherein said control unit controls said motor to provide the forward drive power output after said motor has provided the reverse drive power output within a preset time delay period.

14. The motor driven surface translating amusement device as claimed in claim 12, wherein said control unit controls said motor to provide the reverse drive power output upon detection by said light sensor of a reduction in the light intensity.

15. The motor driven surface translating amusement device as claimed in claim 1, wherein said light sensor is mounted on a bottom side of said base.

16. The motor driven surface translating amusement device as claimed in claim 15, further comprising a light source mounted on said bottom side of said base adjacent to said light sensor for enhancing brightness at said bottom side of said base.

17. The motor driven surface translating amusement device as claimed in claim 16, wherein said light source is mounted in an inclined position on said bottom side of said base so that a portion of light emitted by said light source can be reflected by the surface to said light sensor.

* * * * *